(12) United States Patent
Wofford et al.

(10) Patent No.: US 7,695,211 B1
(45) Date of Patent: Apr. 13, 2010

(54) RETAINER FOR PREVENTING ACCIDENTAL BALL JOINT SEPARATION

(76) Inventors: Barry Wofford, 2123 Whitechapel Dr., Toledo, OH (US) 43614; Pamela Wofford, 2123 Whitechapel Dr., Toledo, OH (US) 43614

( * ) Notice: Subject to any disclaimer, the term of this patent is extended or adjusted under 35 U.S.C. 154(b) by 0 days.

(21) Appl. No.: 11/404,678

(22) Filed: Apr. 14, 2006

Related U.S. Application Data

(60) Provisional application No. 60/775,406, filed on Feb. 20, 2006.

(51) Int. Cl.
*F16C 11/06* (2006.01)

(52) U.S. Cl. ........................................... 403/27

(58) Field of Classification Search .................... 403/27
See application file for complete search history.

(56) References Cited

U.S. PATENT DOCUMENTS

2006/0029461 A1* 2/2006 Benick et al. ............... 403/122

* cited by examiner

*Primary Examiner*—Victor MacArthur
(74) *Attorney, Agent, or Firm*—MacMillan, Sobanski & Todd, LLC

(57) ABSTRACT

A retainer for use with a ball and socket joint includes a first portion that is adapted to be connected to a ball stud of a ball and socket joint and a second portion that is adapted to be engaged by a socket of the ball and socket joint. An intermediate portion connects the first and second portions together. A wear indicator is supported on one of the first and second portions. The wear indicator is adapted to be engaged by a portion of the ball and socket joint when a predetermined amount of wear has occurred within the ball and socket joint and to generate a signal in response to such engagement.

9 Claims, 8 Drawing Sheets

US 7,695,211 B1

RETAINER FOR PREVENTING ACCIDENTAL BALL JOINT SEPARATION

CROSS-REFERENCE TO RELATED APPLICATIONS

This application claims the benefit of U.S. Provisional Application No. 60/775,406, filed Feb. 20, 2006, the disclosure of which is incorporated herein by reference.

BACKGROUND OF THE INVENTION

This invention relates in general to ball joints, such as are commonly used in vehicular steering and suspension applications to transmit force between a steering mechanism and a steered wheel of a vehicle. In particular, this invention relates to a device that generates an externally perceptible indication when a predetermined amount of wear has occurred within a ball joint and additionally provides a positive retainer for preventing accidental separation of the components of the ball joint as a result of such wear.

Ball joints are well known structures that are used in a variety of mechanical linkages. For example, ball joints are commonly used in vehicular steering and suspension assemblies to transmit force between a steering mechanism and a steered wheel of a vehicle. A typical ball joint includes a ball stud that is received within in a lubricated socket. The ball stud includes a spherically-shaped head portion having an elongated shaft portion extending therefrom. The spherically-shaped head portion of the ball stud is received within and cooperates with a corresponding spherically-shaped recess formed in the socket. This arrangement positively connects the ball stud to the socket so as to permit forces to be transmitted therethrough, but also allows the ball stud to pivot in any direction relative to the socket.

It has been found that after a period of use, the cooperating portions of the ball stud and the socket of the ball joint will experience wear. Such wear can create undesirable looseness between the ball stud and the socket of the ball joint, resulting in the generation of noise and misalignment between the ball stud and the socket. In extreme cases, such wear can contribute to or cause the accidental separation of the ball stud from the socket, resulting in a total failure of the ball joint. Unfortunately, because the spherically-shaped head portion of the ball stud is received within the corresponding spherically-shaped recess formed in the socket, it is often difficult to determine how much wear has occurred within the ball joint without removing the ball joint from its application and disassembling the ball stud and the socket for inspection. Such removal and disassembly is time consuming and expensive. Thus, it would be desirable to provide a device that generates an externally perceptible indication when a predetermined amount of wear has occurred within the ball joint and additionally provides a positive retainer for preventing accidental separation of the components of the ball joint as a result of such wear.

SUMMARY OF THE INVENTION

This invention relates to a device that generates an externally perceptible indication when a predetermined amount of wear has occurred within a ball joint and additionally provides a positive retainer for preventing accidental separation of the components of the ball joint as a result of such wear. The retainer includes a first portion that is adapted to be connected to a ball stud of a ball and socket joint and a second portion that is adapted to be engaged by a socket of the ball and socket joint. An intermediate portion connects the first and second portions together. A wear indicator is supported on one of the first and second portions. The wear indicator is adapted to be engaged by a portion of the ball and socket joint when a predetermined amount of wear has occurred within the ball and socket joint and to generate a signal in response to such engagement.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
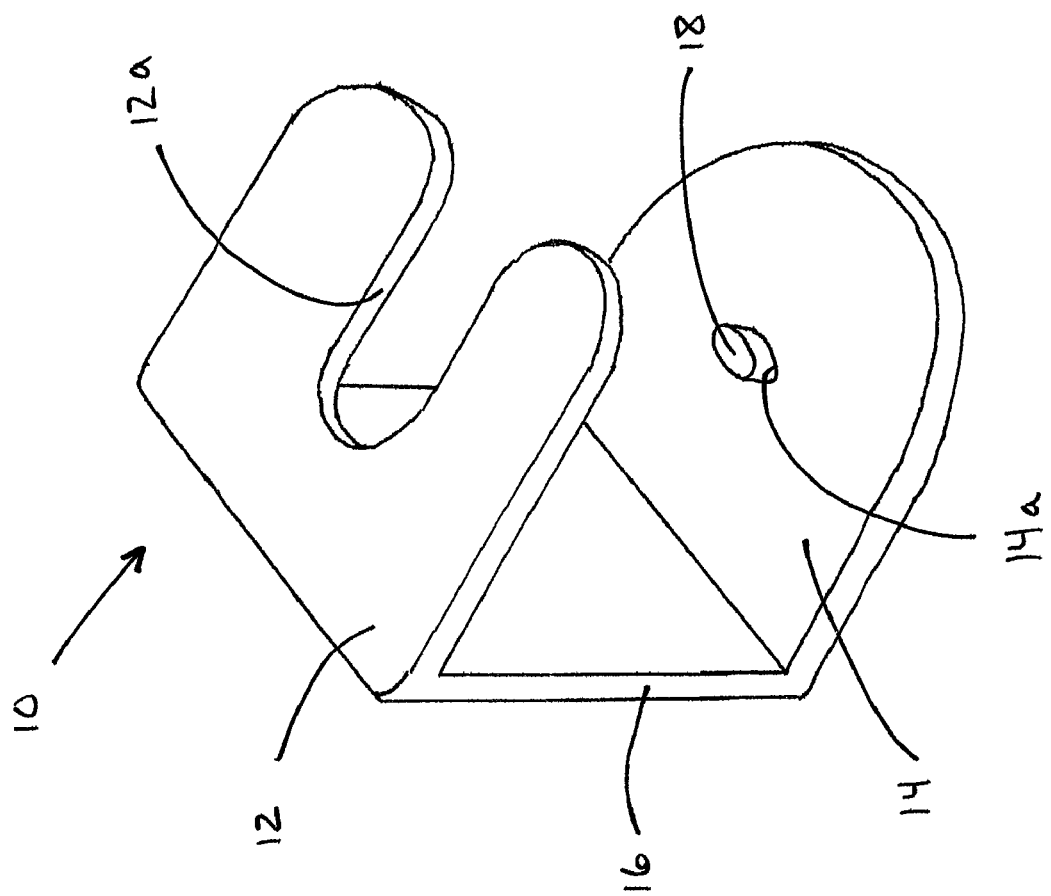
FIG. 1 is a perspective view of a first embodiment of a ball joint retainer in accordance with this invention.

Referring now to the drawings, there is illustrated in FIGS. 1 through 4 a first embodiment of a ball joint retainer, indicated generally at 10, in accordance with this invention. The first embodiment of the ball joint retainer 10 includes an upper face 12, a lower face 14, and a connecting face 16. The ball joint retainer 10 can be formed from any suitable material, such as a metallic or a composite material. Preferably, the upper face 12, the lower face 14, and the connecting face 16 are integrally formed from a single piece of material. It will be appreciated, however, that some or all of the upper face 12, the lower face 14, and the connecting face 16 may be formed from separate pieces of material that are secured together by any suitable means, such as by welding or fasteners.

The upper face 12 is preferably a planar surface that is generally U-shaped, having a slot 12a formed therein at the end opposite the connecting face 16. It will be appreciated, however, that the upper face 12 and the slot 12a may have any other suitable shape for accomplishing the function described in detail below. The purpose of the slot 12a will be explained below. The lower face 14 of the ball joint retainer 10 is also preferably a planar surface having an end surface opposite the connecting face 16 that is preferably semi-circular or semi-elliptical in shape. It will be appreciated, however, that the lower face 14 may have any other suitable shape for accomplishing the function described in detail below. An aperture 14a is formed through the lower face 14. The purpose of the aperture will be explained below.

The connecting face 16 is also preferably a planar surface that extends between the upper face 12 and the lower face 14. Preferably, the upper face 12, the lower face 14, and the connecting face 16 are all formed integrally from a single piece of material, although such is not required. The upper face 12 and the lower face 14 preferably extend generally parallel to one another and generally perpendicular to the connecting face 16, although any other suitable arrangement can be provided.

A wear indicator 18 is disposed within the aperture 14a formed through the lower face 14 of the ball joint retainer 10. The aperture 14a and the wear indicator 18 can be formed having any desired shape or shapes. Preferably, however, the wear indicator 18 is received within the aperture 14a in a press fit relationship that normally retains the indicator 18 in a fixed position relative to the lower face 14 of the ball joint retainer 10, yet which allows the wear indicator 18 to move relative to the lower face 14 of the ball joint retainer 10 in the manner described below. The wear indicator 18 can be formed from any suitable material, such as a metal or composite material. Initially, a portion of the wear indicator 18 extends into the space defined between the upper surface of the lower face 14 and the lower surface of the upper face 12 of the ball joint retainer 10.

Figure 2:
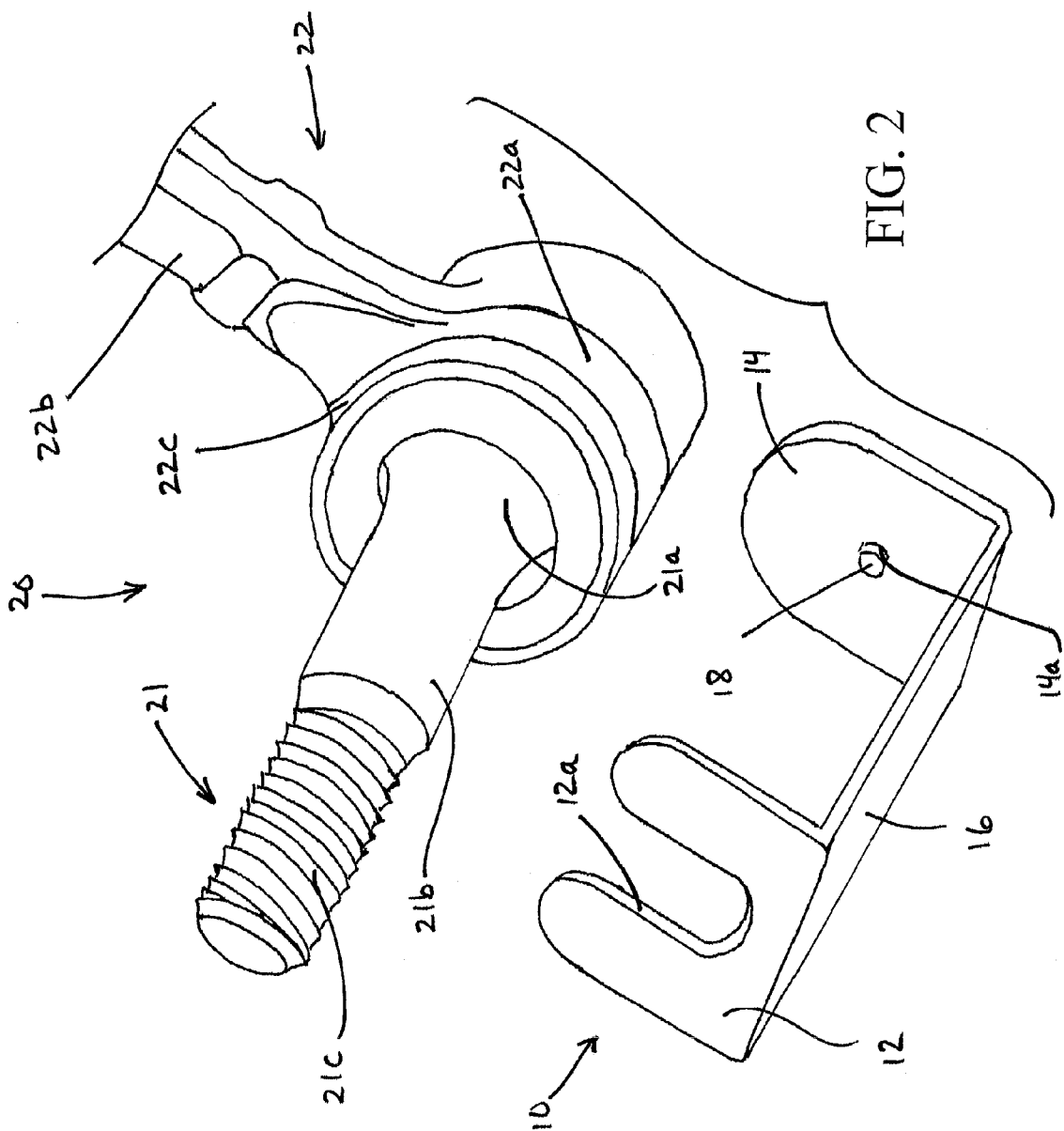
FIG. 2 is an exploded perspective view of the first embodiment of the ball joint retainer illustrated in FIG. 1 shown prior to being assembled with a conventional ball joint.
Figure 3:
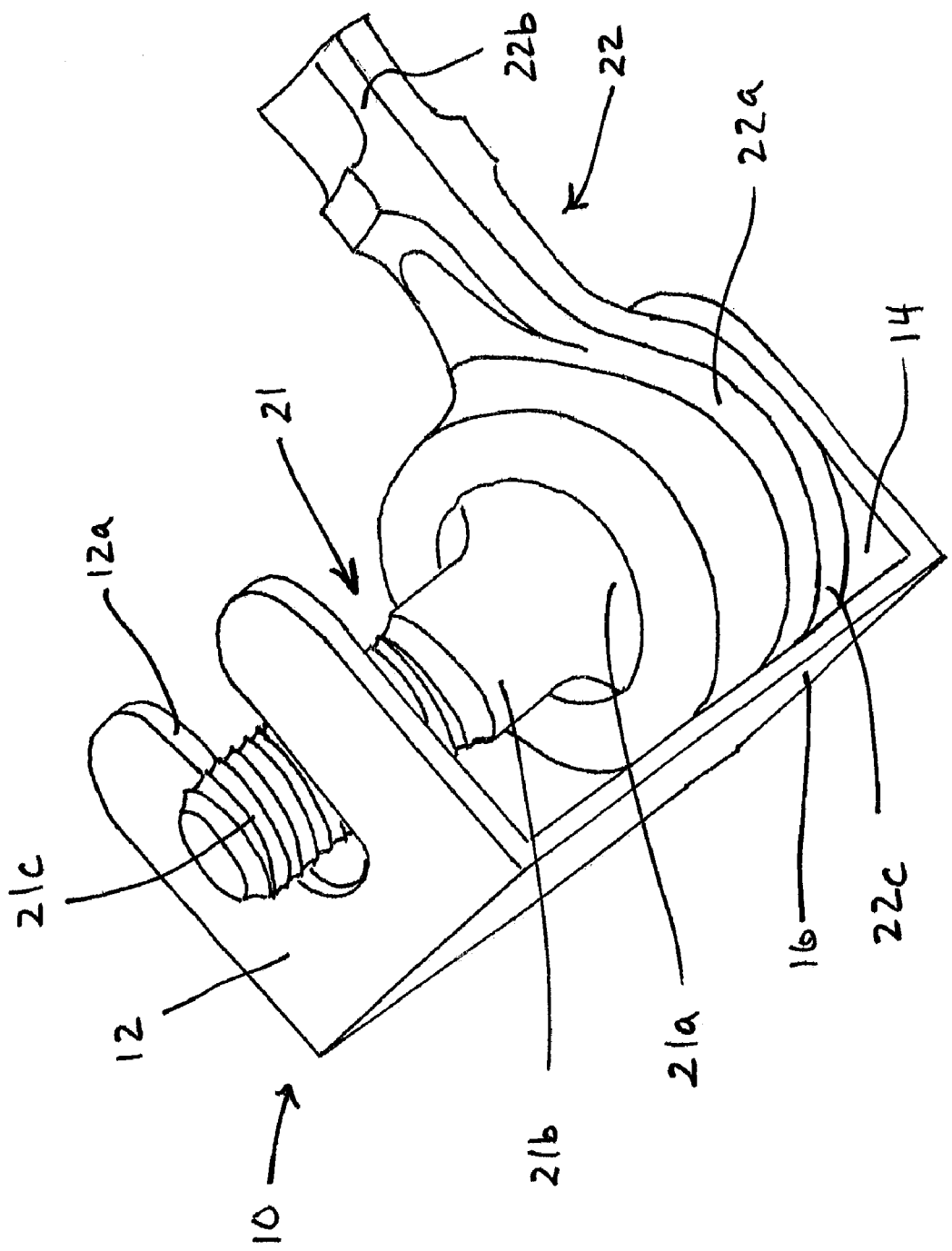
FIG. 3 is a perspective view of the first embodiment of the ball joint retainer and the ball joint illustrated in FIG. 2 shown assembled.
Figure 4:
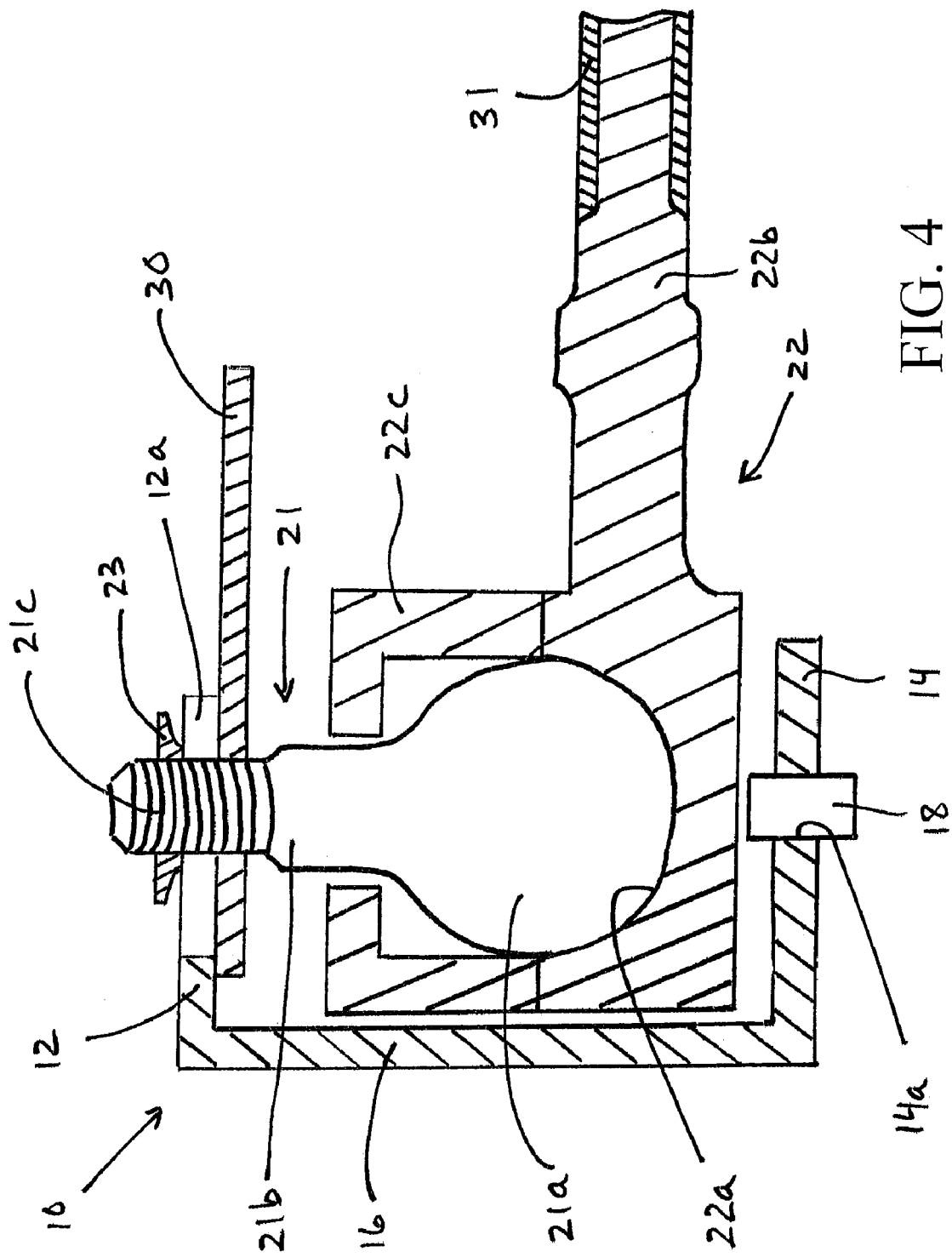
FIG. 4 is a sectional elevational view of the first embodiment of the ball joint retainer and the ball joint illustrated in FIG. 3.

The ball joint retainer 10 is adapted for use with a ball joint, such as indicated generally at 20 in FIGS. 2, 3, and 4. The illustrated ball joint 20 is conventional in the art and is intended to be representative of any type of ball joint structure. As shown therein, the illustrated ball joint 20 includes a ball stud, indicated generally at 21, that is received within in a lubricated socket, indicated generally at 22. The ball stud 21 includes a spherically-shaped head portion 21a having an elongated shaft portion 21b extending therefrom. If desired, the end of the elongated shaft portion 21b can be formed having an external thread 21c, for a purpose that will be explained below. The socket 22 includes a spherically-recessed base portion 22a having an elongated shaft portion 22b extending therefrom. The spherically-shaped head portion 21a of the ball stud 21 is received within and cooperates with the corresponding spherically-shaped base portion 22a of the socket 22. A retainer 22c is provided to positively retain the spherically-shaped head portion 21a of the ball stud 21 in engagement with the corresponding spherically-shaped base portion 22a of the socket 22. This arrangement positively connects the ball stud 21 to the socket 22 so as to permit forces to be transmitted through the ball joint 10, but also allows the ball stud 21 to pivot in any direction relative to the socket portion 22. The shaft portions 21b and 22b of the ball stud 21 and the socket 22, respectively, facilitate the connection of the ball joint 20 to respective components 30 and 31 of a mechanical linkage (see FIG. 4), such as in a vehicular steering and suspension assembly to transmit force between a steering mechanism and a steered wheel of a vehicle.

FIGS. 2, 3, and 4 illustrate the manner in which the ball joint retainer 10 of this invention is installed on the ball joint 20. Initially, as shown in FIG. 2, the ball joint retainer 10 is aligned with the ball joint 20 such that the shaft portion 21b of the ball stud 21 is aligned with the slot 12c formed in the upper face 12 of the ball joint retainer 10, and further that the spherically-shaped base portion 22a of the socket 22 is aligned with the lower face 14 of the ball joint retainer 10. Then, as shown in FIG. 3, the ball joint retainer 10 is moved laterally relative to the ball joint 20 such that the shaft portion 21b of the ball stud 21 is received within the slot 12c formed in the upper face 12 of the ball joint retainer 10, and further that the spherically-shaped base portion 22a of the socket 22 is disposed above and adjacent to the lower face 14 of the ball joint retainer 10. Lastly, as shown in FIG. 4, the components 30 and 31 of the mechanical linkage are secured to the shaft portions 21b and 22b of the ball stud 21 and the socket 22, respectively. The component 30 can, for example, be connected to the shaft portion 21b of the ball stud 21 by threading a nut 23 or similar retainer onto the external thread 21c of the shaft portion 21b. The component 31 can, for example, be directly connected to the shaft portion 22b of the socket 22.

The ball joint retainer 10 is initially installed about the ball joint 20 so that the socket 22 of the ball joint 20 is not in direct contact with the wear indicator 18 supported on the lower face 14 of the ball joint retainer 10, as shown in FIG. 4. Thus, a predetermined amount of clearance initially exists between the lower surface of the socket 22 and the upper surface of the wear indicator 18. This predetermined amount of clearance allows for the ball joint 20 to experience normal wear prior to coming into contact with the wear indicator 18 of the ball joint retainer 10. However, as the components of the ball joint 20 become worn, or when lubricant provided within the socket 22 is depleted, the ball joint 20 will become loose, and the socket 22 will move relative to the ball joint retainer 10. This causes the lower surface of the socket 22 to come into contact with the upper surface of the wear indicator 18. Such contact between the socket 22 and the wear indicator 18 causes the wear indicator 18 to move relative to the lower face 14 of the ball joint retainer 10. The contact between the socket 22 and the wear indicator 18, as well as the movement of the wear indicator 18 relative to the lower face 14 of the ball joint retainer 10, generates an audible signal that will warn the driver of the vehicle that the ball joint 20 is becoming worn. Additionally, the outer surface of the wear indicator 18 can be provided with indicia that, when viewed from below the lower surface of the lower face 14 of the ball joint retainer 10, can provide a visual indication of the undesirable amount of such wear. Accordingly, it can be seen that an externally perceptible indication is generated when a predetermined amount of wear has occurred within the ball joint 10. At the same time, the ball joint retainer provides a positive retainer for preventing accidental separation of the ball stud 21 and the socket 22 of the ball joint 20 as a result of such wear.

Alternatively, the wear indicator 18 can also be positioned within an aperture in the bottom surface of the socket 22, instead of in the lower face 14 of the ball joint retainer 10. In such an alternative arrangement, the wear indicator 18 operates similarly to that described above, with the spherically-shaped head portion 21a of the ball stud 21 coming into contact with the wear indicator 18 as the ball joint 20. As the ball stud 21 contacts the wear indicator 18, the wear indicator 18 would move outwardly relative to the socket 22 into engagement with the lower face 14 of the ball joint retainer 10, resulting in an audible signal that will warn the driver of the vehicle that the ball joint 20 is becoming worn.

Figure 5:
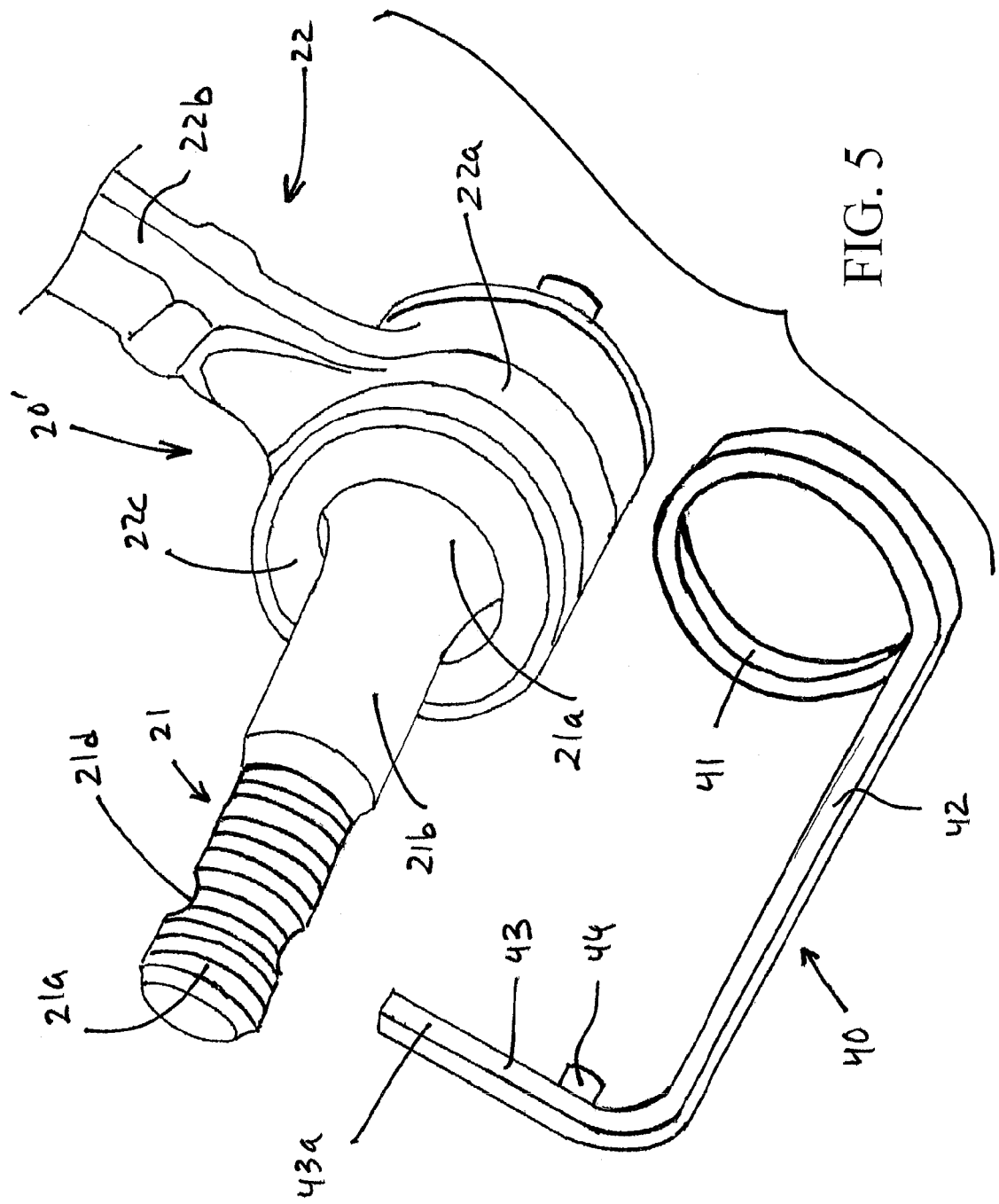
FIG. 5 is an exploded perspective view of a second embodiment of a ball joint retainer in accordance with this invention shown prior to being assembled with a conventional ball joint.
Figure 6:
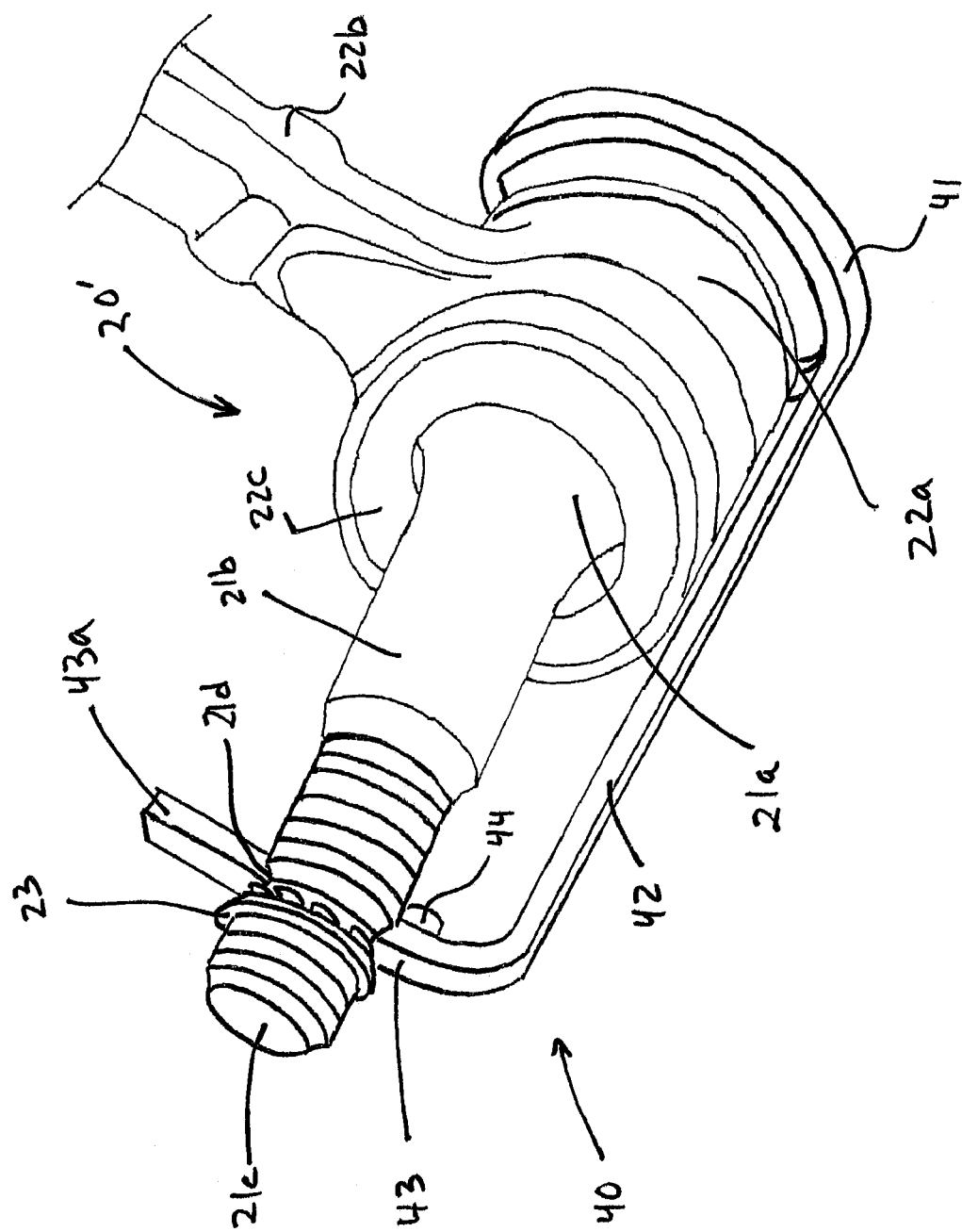
FIG. 6 is a perspective view of the second embodiment of the ball joint retainer and the ball joint illustrated in FIG. 5 shown assembled.

FIGS. 5 and 6 illustrate a second embodiment of a ball joint retainer, indicated generally at 40, in accordance with this invention. In this embodiment, the ball joint retainer 40 is formed from a wire-like piece of material that is formed having a ring portion 41, a connecting portion 42, and a support portion 43 that terminates in an end 43a. In the illustrated embodiment, the ring portion 41, the connecting portion 42, and the support portion 43 are integrally formed from a single piece of material, although such is not required. The ball joint retainer 40 may be formed from any desired material, such as a metallic material. In the illustrated embodiment, the ring portion 41 and the support portion 43 extend generally perpendicularly relative to the connecting portion 42, although such is not required. If desired, a stop 44 can be provided on the support portion 43 of the ball joint retainer 40 for a purpose that will be described below.

The ball joint retainer 40 of this embodiment of the invention is adapted for use with a modified ball joint, indicated generally at 20'. The modified ball joint 20' is, in large measure, identical to the ball joint 20 described above, and like reference numbers are used to indicate similar structures. The modified ball joint 20' further includes, however, an aperture 21*d* that is formed through the shaft portion 21*b* of the ball stud 21. The purpose for this aperture 21*d* will be explained below.

Initially, as shown in FIG. 5, the ball joint retainer 40 is aligned with the modified ball joint 20' such that the support portion 43 of the ball joint retainer 40 is aligned with the aperture 21*d* formed through the shaft portion 21*b* of the ball stud 21, and further that the ring portion 41 of the modified ball joint retainer 40 is aligned with the socket 22. Then, as shown in FIG. 6, the ball joint retainer 40 is moved laterally relative to the modified ball joint 20' such that the support portion 43 of the ball joint retainer 40 extends through the aperture 21*d* formed through the shaft portion 21*b* of the ball stud 21. The support portion 43 can be inserted through the aperture 21*d* until the stop 44 provided on the support portion 43 engages the shaft portion 21*b* of the ball stud 21. Preferably, the support portion 43 of the ball joint retainer 40 extends sufficiently through the aperture 21*d* so as to expose the end 43*a*, as also shown in FIG. 6. At the same time, the ring portion 41 of the modified ball joint retainer 40 is disposed below and adjacent to the socket 22. Lastly, as also shown in FIG. 6, the nut 23 is threaded onto the external thread 21*c* of the shaft portion 21*b* to secure the ball joint retainer 40 to the modified ball joint 20'. Although not illustrated in FIGS. 5 and 6, the components 30 and 31 of the mechanical linkage can be connected to the assembly in the same manner as described above.

The ball joint retainer 40 is positioned on the modified ball joint 20' such that a predetermined amount of clearance exists between the ring portion 41 and the support portion 43 of the retainer 40 and the socket 22 of the modified ball joint 20'. This clearance allows for the modified ball joint 20' to experience normal wear prior to coming into contact with the ball joint retainer 40. Accordingly, the installation of the ball joint retainer 40 on the modified ball joint 20' positions the ring portion 41 of underneath the socket 22 of the modified ball joint 20'. As the components of the modified ball joint 20' become worn, or the lubricant within the socket 22 is depleted, the modified ball joint 20' will become loose, and the socket 22 will move relative to the ball joint retainer 40. This causes the socket 22 to come into contact with the ring portion 41 or the support portion 43 of the ball joint retainer 40. This contact will generate a clanging sound that will audibly alert the driver of the vehicle that the modified ball joint 20' is becoming worn.

Figure 7:
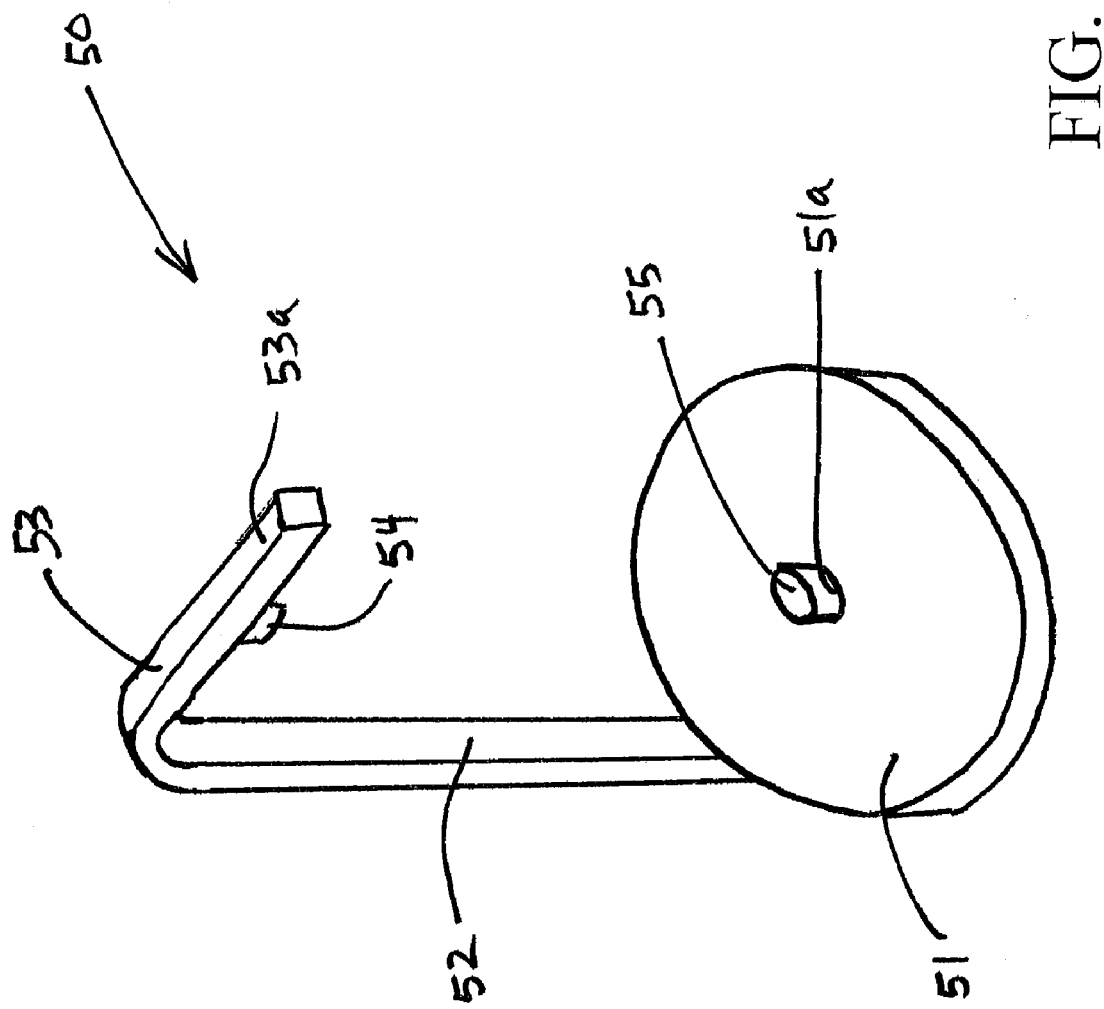
FIG. 7 is a perspective view of a third embodiment of a ball joint retainer in accordance with this invention.

FIG. 7 illustrates a third embodiment of a ball joint retainer, indicated generally at 50, in accordance with this invention. In this embodiment, the ball joint retainer 50 includes a lower face portion 51, a connecting portion 52, and a support portion 53 that terminates in an end 53*a*. In the illustrated embodiment, the connecting portion 52 and the support portion 53 are integrally formed from a single piece of material, although such is not required. The lower face portion 51 is preferably formed from a separate solid sheet of metallic material having any suitable shape, such as circular or elliptical. The lower face portion 51 can be secured to the connecting portion 52 using any suitable means, such as welding, adhesives, or fasteners. In the illustrated embodiment, the lower face portion 51 and the support portion 53 extend generally perpendicularly relative to the connecting portion 52, although such is not required. If desired, a stop 54 can be provided on the support portion 53 of the ball joint retainer 50 for the same purpose as the stop 44 described above. A wear indicator 55 is disposed within an aperture 51*a* formed through the lower face portion 51 of the ball joint retainer 50 for the same purpose as described above.

The lower face portion 51 and the connecting portion 52 can be oriented in any suitable manner relative to the support portion 53 that allows the ball joint retainer 50 to be fitted about the ball joint 20. The length of the connecting portion 52 is preferably sufficient to allow the support portion 53 to be inserted through the aperture 21*d* formed through the shaft portion 21*b* of the ball stud 21, as described above in connection with FIGS. 5 and 6. The support portion 53 can be inserted through the aperture 21*d* until the stop 54 provided on the support portion 53 engages the shaft portion 21*b* of the ball stud 21. Preferably, the support portion 53 of the ball joint retainer 50 extends sufficiently through the aperture 21*d* so as to expose an end thereof, as also described above. At the same time, the lower face portion 51 of the modified ball joint retainer 50 is disposed below and adjacent to the socket 22. Lastly, the nut 23 is threaded onto the external thread 21*c* of the shaft portion 21*b* to secure the ball joint retainer 40 to the modified ball joint 20'. The components 30 and 31 of the mechanical linkage can be connected to the assembly in the same manner as described above.

The ball joint retainer 50 is positioned on the modified ball joint 20' such that a predetermined amount of clearance exists between the lower face portion 51 and the support portion 53 of the retainer 50 and the socket 22 of the modified ball joint 20'. This clearance allows for the modified ball joint 20' to experience normal wear prior to coming into contact with the ball joint retainer 40. Accordingly, the installation of the ball joint retainer 50 on the modified ball joint 20' positions the lower face portion 51 of underneath the socket 22 of the modified ball joint 20'. As the components of the modified ball joint 20' become worn, or the lubricant within the socket 22 is depleted, the modified ball joint 20' will become loose, and the socket 22 will move relative to the ball joint retainer 50. This causes the socket 22 to come into contact with the wear indicator 55 supported on the lower face portion 51 or the support portion 43 of the ball joint retainer 40. This contact will generate a clanging sound that will audibly alert the driver of the vehicle that the modified ball joint 20' is becoming worn. Additionally, the outer surface of the wear indicator 55 can be provided with indicia that, when viewed from below the lower surface of the lower face portion 51 of the ball joint retainer 50, can provide a visual indication of the undesirable amount of such wear. Accordingly, it can be seen that an externally perceptible indication is generated when a predetermined amount of wear has occurred within the ball joint 20'. At the same time, the ball joint retainer 50 provides a positive retainer for preventing accidental separation of the ball stud 21 and the socket 22 of the ball joint 20' as a result of such wear.

Figure 8:
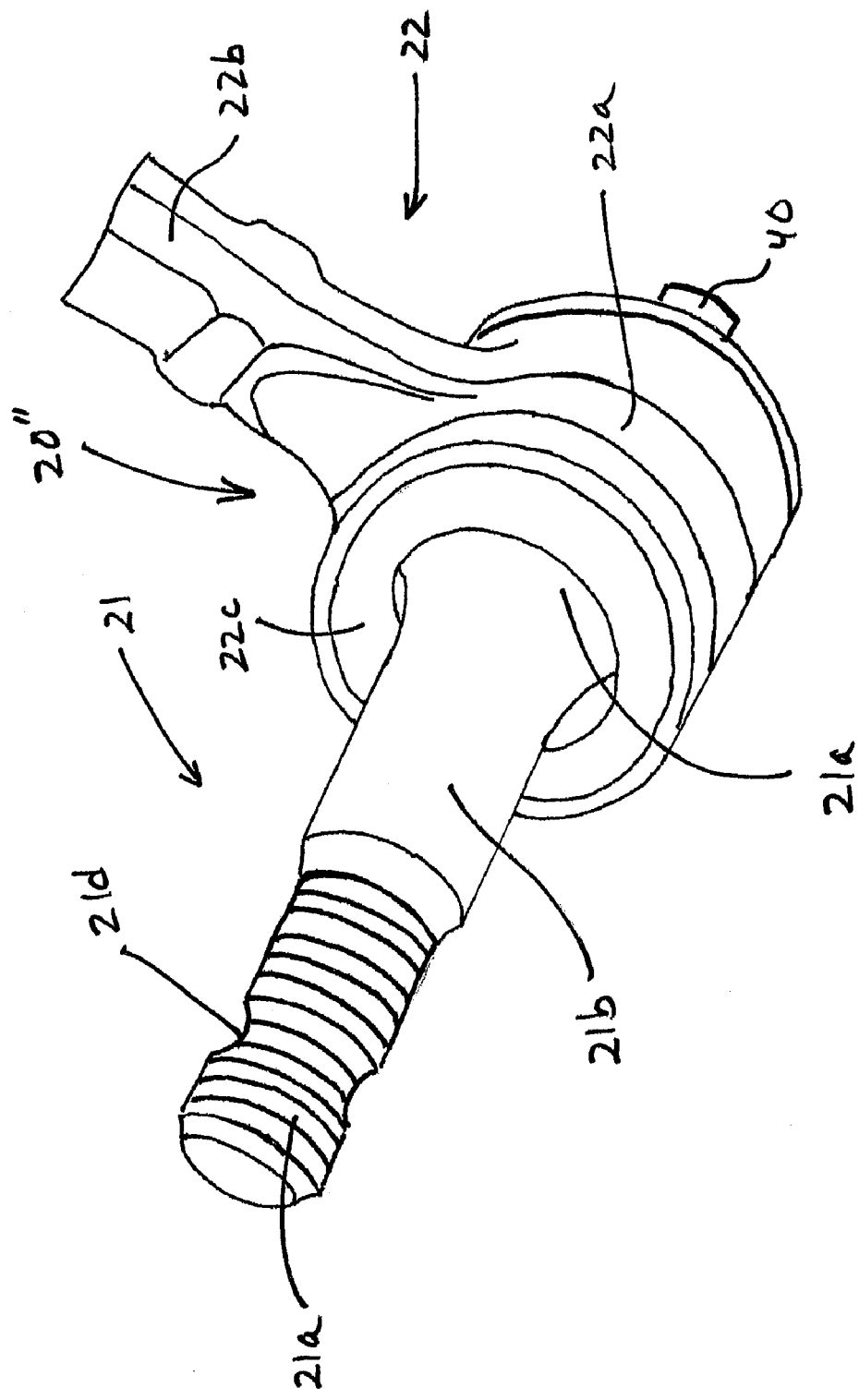
FIG. 8 is a perspective view of a ball joint including an electronic wear indicator in accordance with this invention.

FIG. 8 is a perspective view of a further modified ball joint, indicated generally at 20". The further modified ball joint 20" is, in large measure, identical to the ball joint 20 described above, and like reference numbers are used to indicate similar structures. The further modified ball joint 20" includes an electronic wear indicator 40 in accordance with this invention. The electronic wear indicator 40 is supported on or within a portion of the further modified ball joint 20". For example, the electronic wear indicator 40 can be supported on or within the spherically-recessed base portion 22*a* of the socket 22, as shown in FIG. 8. Alternatively, the electronic wear indicator 40 can be supported on or within the spherically-recessed head portion 21a of the ball stud 21. The electronic wear indicator 40 can be embodied as any conventional wired or wireless device that is responsive to an undesirable amount of looseness within the further modified ball joint 20" for generating a signal. For example, the electronic wear indicator 40 can be embodied as a normally open ground switch that closes a conventional signaling circuit (not shown) when the components of the further modified ball joint 20" become worn. Alternatively, the electronic wear indicator 40 can be embodied as a conventional proximity detector that forms a portion of a conventional signaling circuit (not shown) for generating a signal when the components of the further modified ball joint 20" become worn.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly for pivotally connecting a first and second component, said assembly comprising:
    a ball adapted to fixedly receive the first component; said ball having a shaft portion and spherical portion the ball defining a central axis of symmetry therethrough, said shaft portion being threaded to receive a nut;
    a socket adapted to fixedly receive the second component, said socket pivotally receiving said spherical portion therein for allowing pivotal motion between the first component and the second component;
    a U-shaped retainer of homogenous one-piece construction including first and second portions adapted to retain said spherical portion and socket therebetween, each of said first and second portions lying in respective planes offset from one another and perpendicular to said central axis, said first portion adapted to be fixedly clamped between the nut and the first component creating a gap between said socket and said second portion, and an intermediate portion extending perpendicularly from an edge of said first portion to and edge of said second portion to prevent separation of the spherical portion from the socket, and whereby a predetermined amount of wear between the spherical portion and the socket causes the gap to be reduced such that a wear indicator supported on said second portion is engaged by said socket to generate a signal in response to such engagement.

2. The assembly defined in claim 1 wherein said first portion is a first planar surface and said second portion is a second planar surface, and wherein said wear indicator is supported on said second planar surface.

3. The assembly defined in claim 2 wherein said intermediate portion is a third planar surface that is formed integrally with said first and second planar surfaces.

4. The assembly defined in claim 1 wherein said first portion is a first planar surface having a slot formed therein that is adapted to receive a portion of said ball and socket joint therein.

5. The assembly defined in claim 1 wherein said first portion is formed from a wire-shaped piece of material and said second portion is formed from a ring-shaped piece of material.

6. The assembly defined in claim 5 wherein said intermediate portion is formed from a wire-shaped piece of material that is formed integrally with said first and second portions.

7. The assembly defined in claim 5 wherein said first portion is provided with a stop.

8. The assembly defined in claim 1 wherein said first portion is formed from a wire-shaped piece of material and said second portion is formed from a solid sheet of metallic material, and wherein said wear indicator is supported on said second portion.

9. The assembly defined in claim 8 wherein said intermediate portion is formed from a wire-shaped piece of material that is formed integrally with said first portion and is connected to said second portion.

\* \* \* \* \*